United States Patent
Stevens

(10) Patent No.: US 12,010,960 B2
(45) Date of Patent: Jun. 18, 2024

(54) HYDROPONIC RESERVOIR COVER

(71) Applicant: David Stevens, San Clemente, CA (US)

(72) Inventor: David Stevens, San Clemente, CA (US)

(*) Notice: Subject to any disclaimer, the term of this patent is extended or adjusted under 35 U.S.C. 154(b) by 0 days.

(21) Appl. No.: 17/255,659

(22) PCT Filed: Jul. 22, 2020

(86) PCT No.: PCT/US2020/043134
§ 371 (c)(1),
(2) Date: Dec. 23, 2020

(87) PCT Pub. No.: WO2021/091602
PCT Pub. Date: May 14, 2021

(65) Prior Publication Data
US 2022/0256791 A1   Aug. 18, 2022

(51) Int. Cl.
*A01G 31/06*   (2006.01)

(52) U.S. Cl.
CPC ..................... *A01G 31/06* (2013.01)

(58) Field of Classification Search
CPC ........ A01G 31/06; A01G 31/02; A01G 27/00; A01G 27/003; A01G 27/006; A01G 27/02; A01G 2031/006
See application file for complete search history.

(56) References Cited

U.S. PATENT DOCUMENTS

| | | | | |
|---|---|---|---|---|
| 3,890,934 A | * | 6/1975 | Walcott | A01K 7/02 |
| | | | | 119/78 |
| 2012/0279126 A1 | * | 11/2012 | Simmons | A01G 31/06 |
| | | | | 47/62 A |
| 2015/0313104 A1 | * | 11/2015 | Cottrell | A01G 22/00 |
| | | | | 47/62 A |
| 2016/0066525 A1 | * | 3/2016 | Duquesnay | A01G 9/025 |
| | | | | 47/62 R |
| 2017/0354096 A1 | * | 12/2017 | Xing | A01G 9/028 |
| 2019/0110416 A1 | * | 4/2019 | Crain | A01G 31/06 |
| 2019/0166778 A1 | * | 6/2019 | Hendrick | A01G 27/008 |
| 2021/0185953 A1 | * | 6/2021 | Bryan, III | A01G 31/02 |

(Continued)

FOREIGN PATENT DOCUMENTS

| | | | | |
|---|---|---|---|---|
| KR | 20170001475 | * | 4/2017 | A01G 7/045 |
| KR | 101789810 | * | 10/2017 | A01G 31/047 |

*Primary Examiner* — Trinh T Nguyen
(74) *Attorney, Agent, or Firm* — My Patent Guys; Christopher Pilling

(57) ABSTRACT

The present invention relates to a reservoir cover for use with hydroponic, aeroponic, aquaponic or similar systems used to cultivate plant articles without soil medium. The reservoir cover containing and re-directing water, nutrients, and other liquids, intentionally or un-intentionally leaked by the system, back into a reservoir or water source the reservoir cover is positioned upon. Within hydroponic, aeroponic, aquaponic or similar systems the plant article is held within a plant growing unit positioned above the reservoir cover. As water is dispersed from within said systems gravity directs movement of water, nutrients, and other liquids to the reservoir cover of the present invention. As water, nutrients and other liquids are leaked or lost from the plant growing unit the reservoir cover is positioned such that water, nutrients and other liquids are not dispersed to an undesirable location, but rather are re-directed back in the original water source or reservoir.

10 Claims, 5 Drawing Sheets

(56) References Cited

U.S. PATENT DOCUMENTS

2021/0212276 A1\* 7/2021 Hersh .................... A01G 31/06
2022/0061242 A1\* 3/2022 Sperry ................... A01G 31/06
2022/0330500 A1\* 10/2022 Sepulveda ............. A01G 9/249

\* cited by examiner

HYDROPONIC RESERVOIR COVER

BACKGROUND

1. Field of the Invention

The present invention relates to a hydroponic reservoir cover for collection and containment of liquids.

2. Description of Related Art

During the operation of commercially available growing systems, including but not limited to hydroponic, aeroponic, aquaponic, or similar systems, herein "hydroponic", water, nutrients, and other liquids are often dispersed throughout an apparatus to plant articles being grown within. Various distribution methods for water, nutrients, and other liquids are commercially available for distributing a fluid source to the plant articles being grown within the system. Exemplary methods include pumps, spray nozzles, gravity, and other similar methods usually from a reservoir. The systems listed above often include water loss, evaporation, and leaks during these disbursement methods. For example, common water loss includes runoff on flat surfaces, seams, joints and connection points between various components of the systems listed above. Furthermore, the reservoir providing water, nutrients, and other liquids for distribution is commonly located below the plant articles being grown within the system. For example, liquid from a reservoir can be pumped up to a portion of the system located above the reservoir. Next, as the water sourced from the reservoir flows back towards the reservoir under the force of gravity, it may escape containment of the system in a variety of ways as described above. Water, nutrients, and other liquids flowing over or out of the system onto the floor, ground, or into an unwanted portion of the system may result in unsafe environments, waste, aesthetic, or other issues. A solution is needed for consistent containment and redirection of water, nutrients, and other liquids back to the reservoir the water, nutrients, and other liquids originated from.

SUMMARY

The present invention relates to a reservoir cover for use with hydroponic, aeroponic, aquaponic, or similar systems used to cultivate plant articles without the use of a soil medium. The reservoir cover containing and re-directing water, nutrients and other liquids, intentionally or un-intentionally leaked by a user of the system, back into a reservoir the reservoir cover is positioned upon. Within most commercially available hydroponic, aeroponic, aquaponic, or similar systems the plant article is held within a plant growing unit positioned above the reservoir cover. As water is dispersed within the system, gravity directs movement of water, nutrients, and other liquids through the plant growing unit and onto the reservoir of the present invention. As water, nutrients, and other liquids are leaked or lost from the plant growing unit, the reservoir cover is positioned such that water, nutrients, and other liquids are not dispersed to an undesirable location, but rather are re-directed back into the reservoir.

The purpose of the present invention is to provide a sloped or curved surface for containment of water, nutrients, and other liquids by use of the force of gravity back into the original reservoir. Once contained within the reservoir the water, nutrients, and other liquids can be re-used, refined or re-dispersed as desired.

In order to do so, a hydroponic system with an improved reservoir cover is provided, comprising a reservoir configured to retain a liquid; a plant growing unit having a plant article positioned above the reservoir, a main reservoir cover body having a top surface, a perimeter edge, and a bottom surface, wherein the main reservoir cover body is positioned between the reservoir and the plant growing unit, wherein the top surface is configured to slope towards the reservoir, at least one first opening positioned upon the main reservoir cover body and extending through the main reservoir cover body or at least one growing unit opening positioned on the plan growing unit adjacent to the main reservoir cover body; and wherein a first mode of operation the liquid is moved from the reservoir to the plant growing unit and the liquid not utilized by the plant article is moved via gravity onto the top surface of the main reservoir cover body and returned to the reservoir through the at least one main reservoir cover body opening or the at least one growing unit opening.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

Figure 1:
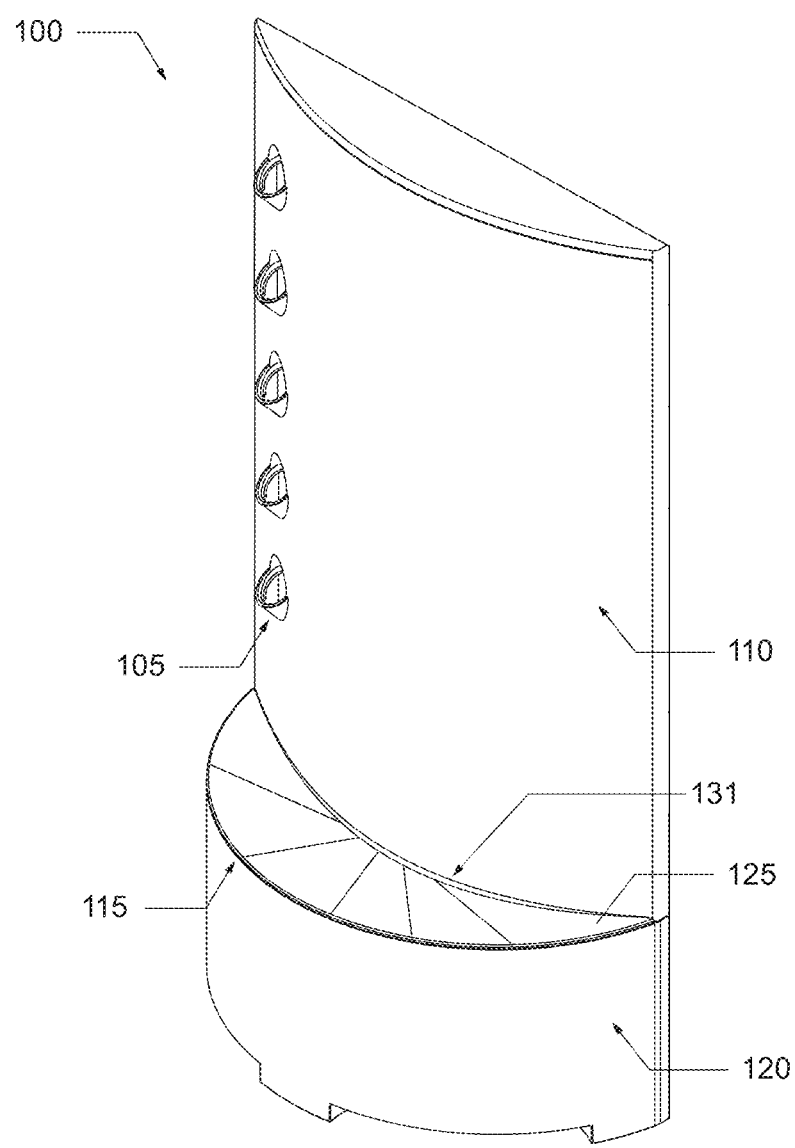
FIG. 1 shows an exemplary perspective view of one embodiment of the reservoir cover system.
Figure 2A:
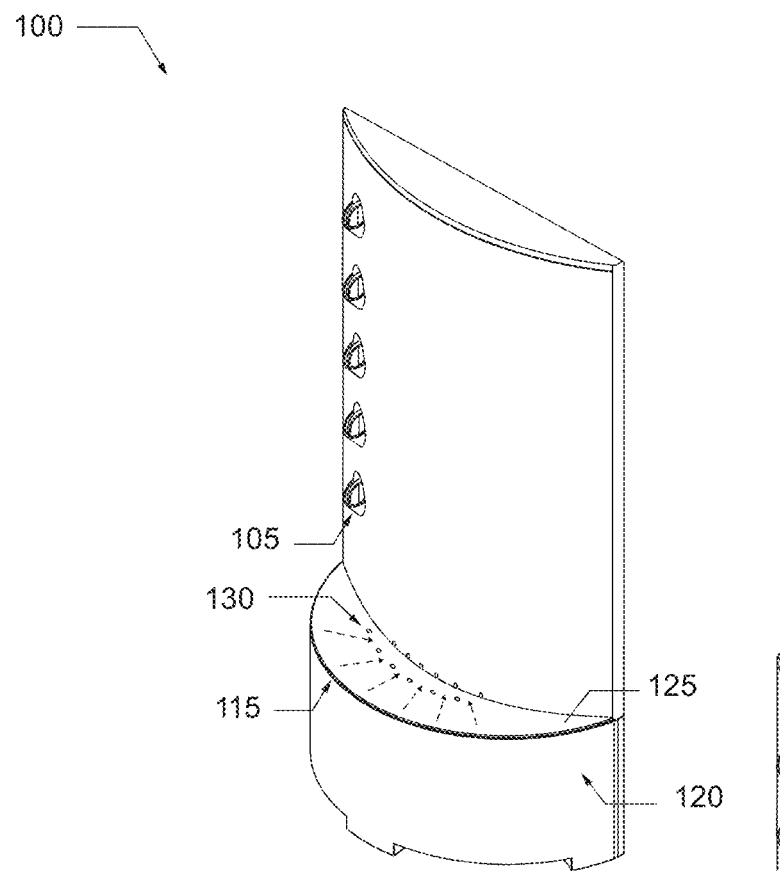
FIG. 2 shows an exemplary perspective view of one embodiment of the reservoir cover system.
Figure 2B:
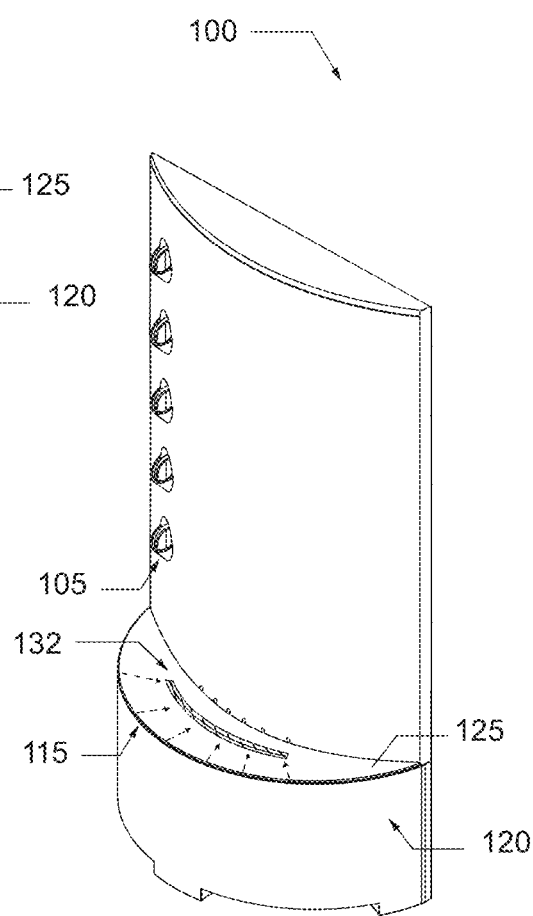
Figure 3:
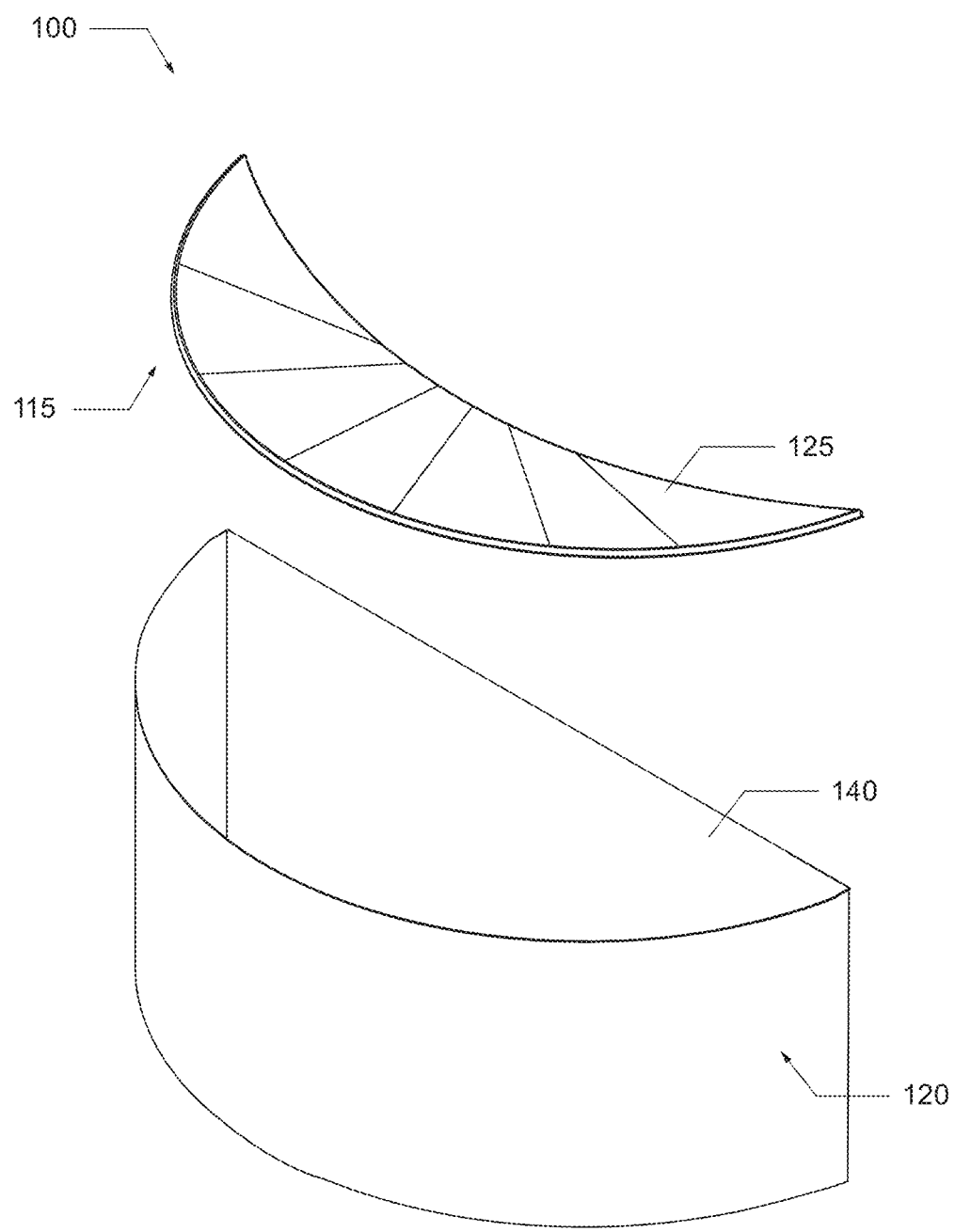
FIG. 3 shows an exemplary perspective exploded view of one embodiment of the reservoir cover system.
Figure 4:
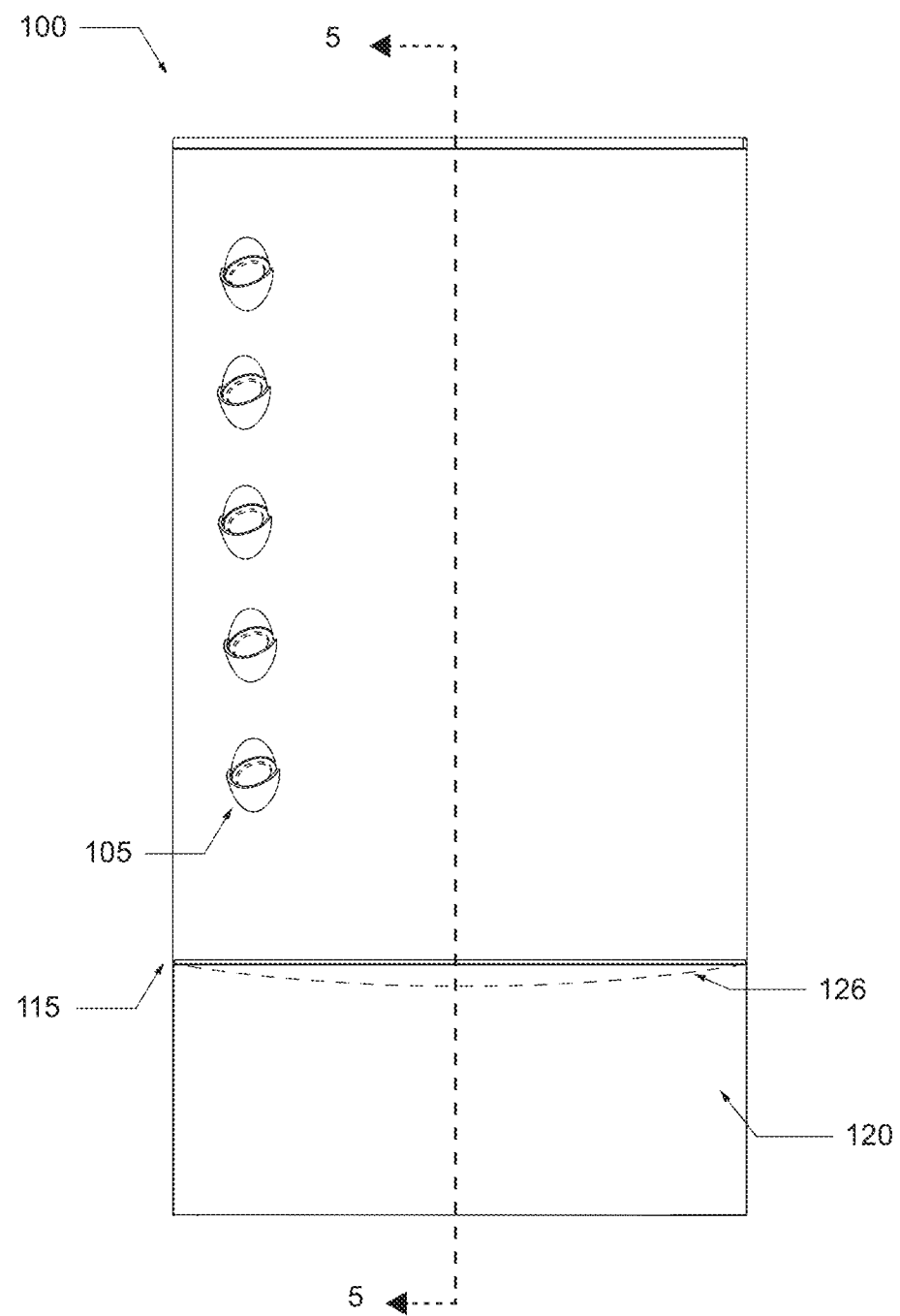
FIG. 4 shows an exemplary front view of one embodiment of the reservoir cover system and parting line 5-5.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

As shown in FIGS. 1-5, a hydroponic system 100 with an improved reservoir cover is provided. The hydroponic system 100 comprises a reservoir 120 and a main reservoir cover body 115 having a top surface 125 and a bottom surface 126. The reservoir 120 is configured to retain a liquid 145 within an internal volume 140. In some embodiments, a plant growing unit 105 for holding a plant article (not shown) during cultivation is positioned above the reservoir 120. Although an exemplary embodiment of the hydroponic system and the plant growing unit 105 are illustrated, the improved reservoir cover may be used with any commercially available hydroponic, aeroponic, aquaponic or similar growing systems, without limitation. In some embodiments, the main reservoir cover body 115 is positioned between the reservoir 120 and the plant growing unit 105. In order to direct the liquid 145 leaked from the plant growing unit 105, or other seams, joints, connection points of the hydroponic system 100, the top surface 125 is configured to slope towards the internal volume 140 of the reservoir 120.

Advantageously, at least one cover opening 130 is provided on the top surface 125 and/or adjacent to the top surface 125. The at least one cover opening 130 configured to direct the liquid 145 from the top surface 125 into the reservoir 120. In some embodiments, the top surface 125 may slope in at a predetermined angle to direct the liquid 145 within the reservoir. In some embodiments, the slope of the top surface 125 may be sloped inward toward the center of the reservoir. In other embodiments, the slope of the top surface 125 may be configured to slope outward toward the edges of a reservoir. In yet another embodiment, the main reservoir cover body 115 may only partially cover the reservoir 120. In configurations wherein the main reservoir cover body 115 only partially covers the reservoir 120, the top surface may slope toward the remaining portion of the reservoir left exposed by the main body cover, as shown in FIG. 1. In other embodiments wherein the main reservoir cover body 115 only partially covers the reservoir 120, the top surface may slope toward at least one growing unit opening 131 positioned adjacent to the top surface 125.

In an exemplary first mode of operation, the liquid 145 is moved from the reservoir 120 to the plant growing unit 105 for use in cultivation of the plant article as well known in the art. Water, nutrients, and other liquids not utilized by the plant article are moved via gravity onto the top surface 125 of the main reservoir cover body 115 and returned to the reservoir 120.

In exemplary environments, such as outdoor environments, the main reservoir cover body 115 may further comprise an interchangeable media layer 132 adjoined to the top surface 125 of the main reservoir cover body 115. The interchangeable media layer 132 configured to be removed from the main reservoir cover body 115 when the accumulation of debris or nutrients of plant material within the interchangeable media layer 132 has accumulated to an undesirable level. In some embodiments, the interchangeable media layer 132 may include a plurality of media layers. In some embodiments, the interchangeable media layer or layers may consist of various materials of high-density and/or low-density, allowing different particles of various sizes to pass through and/or to be stopped. In some embodiments, the interchangeable media layer 132 further comprises at least one member of a media layer set consisting of: a metal screen layer, a metal mesh layer, a metal screen layer, a foam material layer, a solid plastic layer, a wood layer, an electrostatic discharge material layer, a rubber layer, a plastic mesh layer, a wood layer, a perforated plastic layer, a fabric layer, a wool layer, a nonporous material layer, and a urethane plastic layer. In the current exemplary embodiment, the interchangeable media layer 132 may shield the reservoir 120 from detrimental environmental conditions including, but not limited to, wind, rain, electromagnetic fields, fog, dew, dust, sand, living organisms, plant matter, and other detrimental environmental conditions.

Advantageously, the top surface 125 of the main reservoir cover body 115 forms a retaining area configured to prevent water from escaping re-collection within the reservoir 120. Specifically, the retaining area provides a place for water and nutrients to be collected and directed into the internal volume 140 of the reservoir 120. This is a critical step when growing plants without soil through hydroponic, aeroponic, aquaponic or similar systems, as water has the propensity to escape containment from the plant growing unit, creating leaks. As expected, leaks lead to unwanted conditions, including but not limiting to water damage and unsightly watermarks on an outside surface 110 of the system. This is particularly important in urban environments wherein any leaked liquids can lead to damage of property or accumulation of biomass such as mold, mildew, or fungi.

Figure 5:
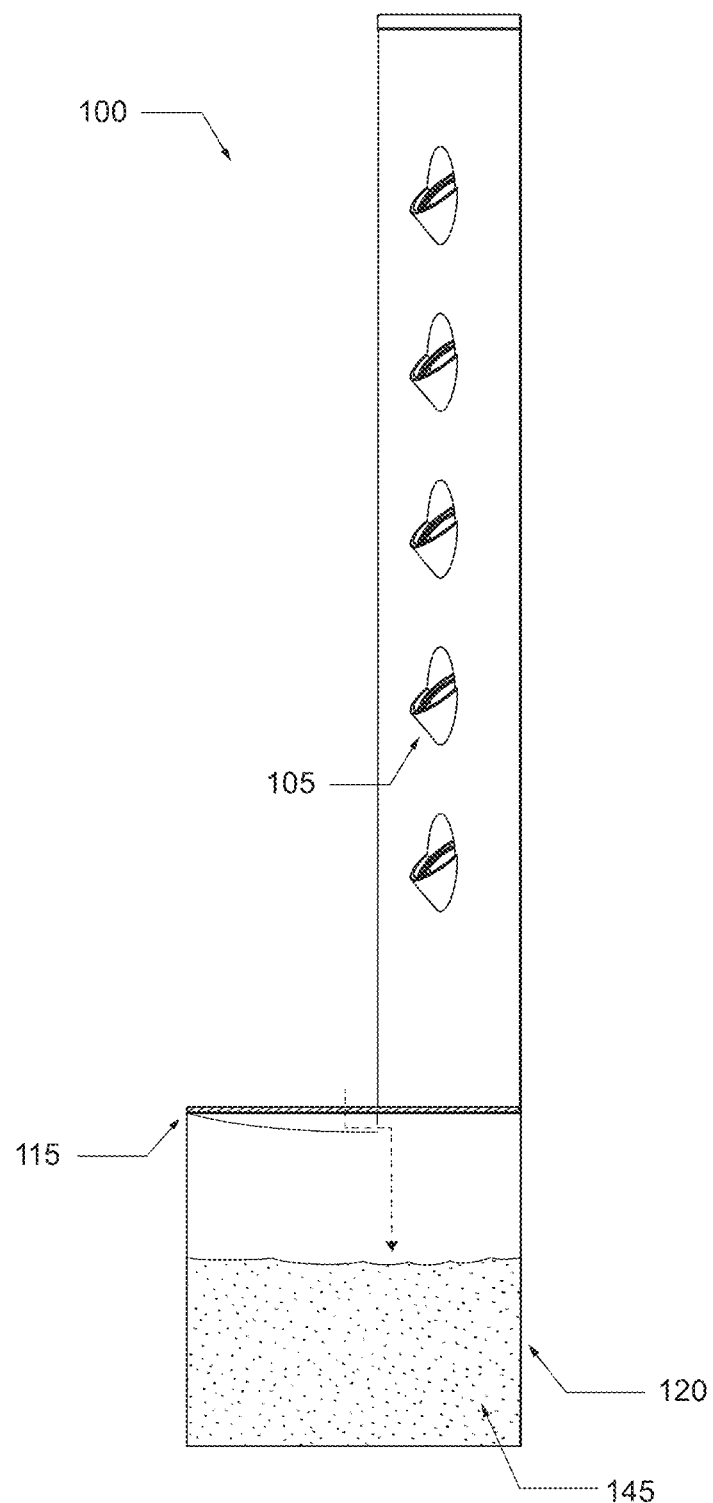
FIG. 5 shows an exemplary cross-sectional view of one embodiment of the reservoir cover system taken along parting line 5-5 of FIG. 4.

In some embodiments, the main reservoir cover body 115 comprises one or more external textures to enable the water to move from the retaining area into the at least one cover opening 130 and/or returned to the reservoir 120, as shown in FIG. 5. Further, the one or more external textures of the main reservoir cover body 115 may assist in the liquid 145 not spilling outside the reservoir 120 and/or the plant growing unit 105, particularly in manual watering situations where too much water is provided to the plant or plants positioned in the plant growing unit. In other embodiments, the main reservoir cover body may further comprise at least one cover opening 130 to allow liquids and other substances to pass through the main reservoir cover body 115. In other embodiments, the plant growing unit 105 may further comprise at least one growing unit opening 131 acting as a passageway for liquid and other substances to enter the reservoir 120. The at least one growing unit opening 131 being positioned adjacent to the top surface. For example, in the exemplary embodiments shown in FIG. 1, the at least one growing unit opening 131 may comprise a slot sized to substantially match the top surface 125 of the main reservoir cover body 115.

In one embodiment, the system 100 is constructed of at least one member of a material set, by way of non-limiting example, consisting of: a metal, a composite, a wood, a composite material, a ceramic, a thermoplastic, and a plastic. In one embodiment, the opening of the reservoir 120 cover can be at least one shape of a shape set, by way of non-limiting example, consisting of: a honeycomb shape, a square, a triangle, a rectangle, an octagon, an oval, or circular shape.

Within the system 100 the main reservoir cover body 115 and the reservoir 120 may be attached by at least one member of an attachment set consisting of: a magnet, a clip, a slide-fit, a clamp, a spring, a heat-shrink material flange, a fastener, a spring, an elastic member, and an adhesive.

In any embodiment disclosed, the system 100 may include a means of identification. The means of identification may be selected from an identification set consisting of: an alphanumeric identification, a human user's name, a symbolic shape, a company brand, a numeric identification number, a QR code, a barcode, and an RFID tag. The means of identification is used for, by way of non-limiting example, for identifying what species of plant is being grown within the plant growing unit, the size of the system 100, or the date in which the plant was placed within the plant growing unit.

Although a semi-circular shape of the main reservoir cover body 115 and reservoir 120 are illustrated, it is understood that any type and/or shape of reservoir 120 and/or main reservoir cover body 115 may be used. For instance, if the reservoir 120 is of a circular shape, the main reservoir cover body 115 is a cylindrical shape or a frusto-conical shape, i.e. the shape of the main reservoir cover body 115 selected should match the shape of the reservoir 120, as the shape of the reservoir 120 may vary. For instance, as previously mentioned, in some embodiments the cross-sectional shape of the reservoir 120 may be rectangular, oval, triangular, or an irregular shape. In some embodiments, the hydroponic system 100 may comprise one or more main reservoir cover body 115. For example, two main body covers 115 may each partially cover the reservoir 120 and interface together to fully and/or partially cover the reservoir 120.

In some embodiments, the main reservoir cover body 115 is made of a material set by way of non-limiting example, consisting of: a metal screen material, a metal mesh material, a metal screen material, a foam material, a solid plastic material, a wood material, a rubber material, a plastic mesh material, a wood material, a perforated plastic material, a fabric material, a wool material, a nonporous material, and a urethane plastic material. In some embodiments, the system 100 is further textured to assist in removing components of the system 100, directing the liquid 145 flow, or moving the reservoir 120. The system 100 can be textured on any surface with at least one member of a texture set consisting of: indentations, sandpaper, extrusions, knurling, a rough surface, bumps, a groove, a recess, a planer surface, an indentation, a protrusion, and a pattern. or any combination thereof.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hydroponic system with an improved reservoir cover comprising:
    a reservoir configured to retain a liquid;
    a plant growing unit having a plant article positioned above the reservoir,
    a main reservoir cover body having a top surface, a perimeter edge, and a bottom surface, wherein the main reservoir cover body is positioned between the reservoir and the plant growing unit, wherein the main reservoir cover body is positioned directly over the reservoir such that the main reservoir cover body covers the reservoir, and wherein the top surface is sloped to direct the liquid within the reservoir;
    wherein a first mode of operation the liquid is moved from the reservoir to the plant growing unit and the liquid not utilized by the plant article is moved via gravity onto the top surface of the main reservoir cover body and returned to the reservoir.

2. The system of claim 1, wherein the hydroponic system comprises at least one main reservoir cover body.

3. The system of claim 1, further comprising at least one first opening positioned upon the main reservoir cover body and extending through the main reservoir cover body.

4. The system of claim 3, wherein the top surface of the main reservoir cover body is sloped inward directing the liquid away from the perimeter edge and through the at least one first opening.

5. The system of claim 3, wherein the top surface of the main reservoir cover body is sloped outward directing the liquid towards the perimeter edge and through the at least one first opening.

6. The system of claim 1, further comprising at least one attachment member adjoined to the perimeter edge of the main reservoir cover body, wherein the at least one attachment member adjoins the main reservoir cover body to the reservoir.

7. The system of claim 6, wherein the at least one attachment member is chosen from an attachment set consisting of: a magnet, a clip, a slide-fit, a clamp, a spring, a heat-shrink material flange, a fastener, an elastic member, and an adhesive.

8. The system of claim 1, wherein the top surface further comprising at least one member of a surface set consisting of: a groove, a recess, a planer surface, a texture, an indentation, a protrusion, and a pattern.

9. The system of claim 1, wherein the top surface of the main reservoir cover body further comprises an external layer of media.

10. The system of claim 9, wherein the external layer of media further comprises at least one member of a media layer set consisting of: a metal screen layer, a metal mesh layer, a foam material layer, a solid plastic layer, a wood layer, an electrostatic discharge material layer, a rubber layer, a plastic mesh layer, a perforated plastic layer, a fabric layer, a wool layer, a nonporous material layer, and a urethane plastic layer.

* * * * *